(No Model.) 2 Sheets—Sheet 1.
W. MONAGHAN.
AUTOMATIC VEHICLE BRAKE.
No. 580,881. Patented Apr. 20, 1897.
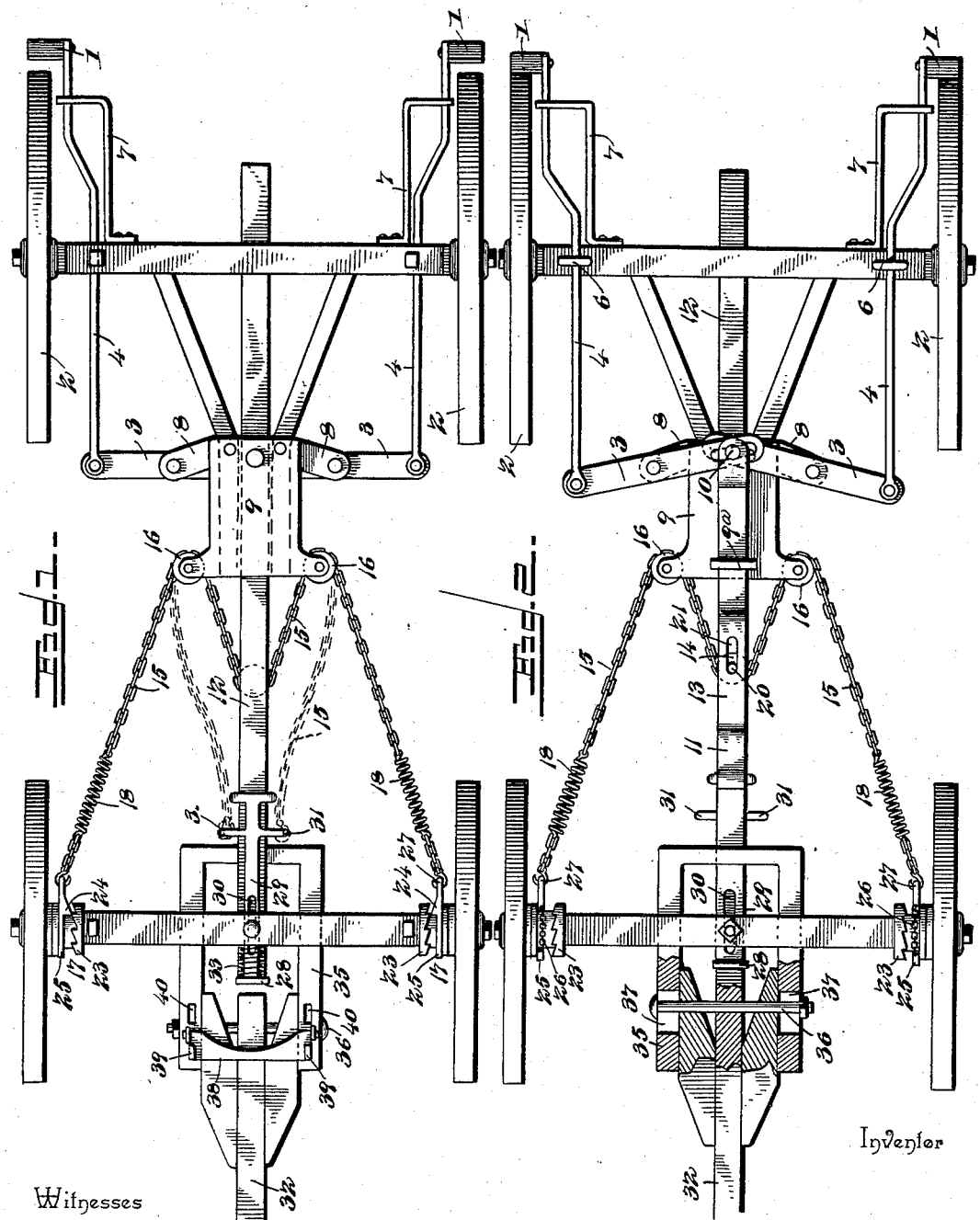
Witnesses
Inventor
William Monaghan
By his Attorneys

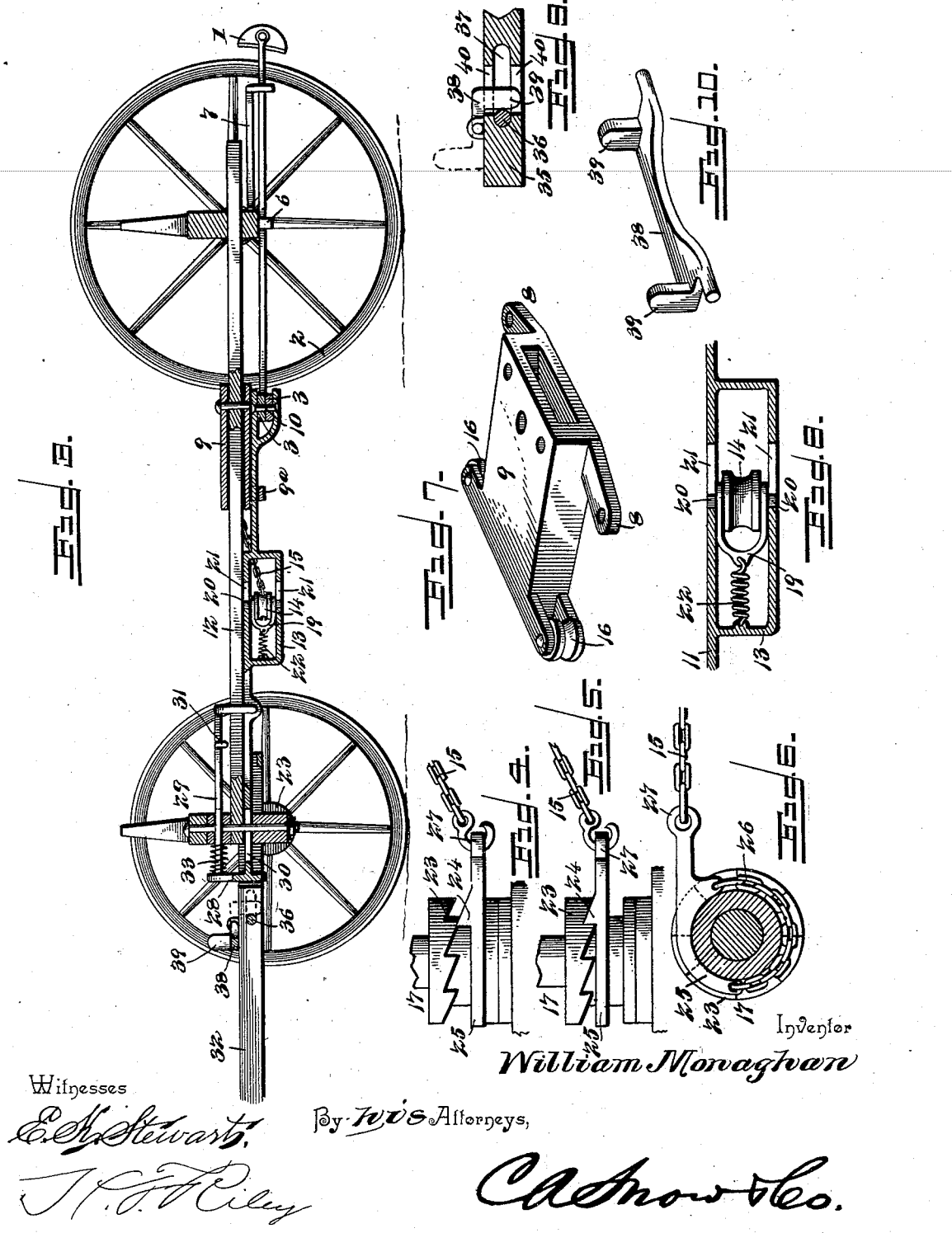

UNITED STATES PATENT OFFICE.

WILLIAM MONAGHAN, OF CHEBOYGAN, MICHIGAN.

AUTOMATIC VEHICLE-BRAKE.

SPECIFICATION forming part of Letters Patent No. 580,881, dated April 20, 1897.

Application filed November 13, 1896. Serial No. 611,964. (No model.)

*To all whom it may concern:*

Be it known that I, WILLIAM MONAGHAN, a citizen of the United States, residing at Cheboygan, in the county of Cheboygan and State of Michigan, have invented a new and useful Automatic Vehicle-Brake, of which the following is a specification.

The invention relates to improvements in automatic vehicle-brakes.

The object of the present invention is to improve the construction of automatic vehicle-brakes and to provide a simple, inexpensive, and efficient one which will be positive and reliable in operation and adapted to operate while a vehicle is traveling either up or down hill to lock a vehicle when a team is stopped, and which may be readily arranged to permit a vehicle to be backed.

The invention consists in the construction and novel combination and arrangement of parts hereinafter fully described, illustrated in the accompanying drawings, and pointed out in the claims hereto appended.

In the drawings, Figure 1 is a plan view of a running-gear provided with an automatic brake constructed in accordance with this invention. Fig. 2 is a reverse plan view, partly in section. Fig. 3 is a longitudinal sectional view. Figs. 4, 5, and 6 are detail views illustrating the construction of the clutches. Fig. 7 is a detail view of the box or casing which connects the rear hounds to the reach. Fig. 8 is a detail view of the loop of the connecting-bar, illustrating the manner of yieldingly mounting the pulley therein. Fig. 9 is a detail view showing the catch arranged in position for locking the tongue or poles against longitudinal movement on the front hounds. Fig. 10 is a detail perspective view of the hinged catch.

Like numerals of reference designate corresponding parts in all the figures of the drawings.

1 designates a pair of brake-shoes arranged in rear of and adapted to engage the hind wheels 2 of a running-gear, and the said brake-shoes are connected with transverse brake-levers 3 by longitudinal rods 4, which are arranged in suitable guides 6 and 7. The guide 6 consists of eyes mounted on the rear axle at the lower face thereof, and the guide 7 consists of substantially L-shaped arms secured to and extending rearward from the rear bolster of the running-gear and provided at their rear ends with eyes or loops located adjacent to the hind wheels.

The transverse brake-levers 3 are fulcrumed between their ends on laterally-projecting arms 8 of a box or casing 9, which connects the front ends of the rear hounds with the reach. The inner terminals of the transverse brake-levers 3 are overlapped and slotted to receive a pivot 10, which secures them to a longitudinal connecting-bar 11, and the latter extends along the reach 12 of the running-gear to the front portion thereof and is adapted to be moved rearward, by means hereinafter described, to apply the brake and carry the brake-shoes into contact with the hind wheels. The box or casing 9 is provided at its lower face with a depending guide or loop 9ª, which receives and supports the longitudinally-movable connecting-bar.

The connecting-bar, which extends along the lower face of the reach, is provided between its ends with a rectangular loop 13, in which a pulley 14 is yieldingly mounted, and a flexible connection 15, such as a chain or the like, passes around the pulley 14 and extends rearward at opposite sides of the reach to a pair of pulleys 16, which are mounted on the box or casing 9, and the chains 15 are connected by clutches 17 with the hubs of the front wheels, whereby when the hubs rotate rearwardly the chain will be wound around the hubs and will draw the connecting-bar rearward to apply the brake. This construction operates when a vehicle is ascending a hill and it is desired to stop a team. When the team is stopped, the vehicle is permitted to move rearward slightly, sufficiently to wind the flexible connection 15 around the hubs and apply the brake. Instead of employing a chain the flexible connection may consist of a cable or link-rods or a similar construction, and it is provided at opposite sides with spiral springs 18, which are distended when the brake is applied in the manner aforesaid and which assist by their contraction in rotating the front wheels forward to start the vehicle.

The pulley 14 is arranged within a yoke 19 on a pivot 20, which has its terminals disposed in longitudinal slots 21 of the loop 13, and the yoke 19 is connected with the front of the loop by a spiral spring 22. The pulleys 16 are mounted between perforated ears or extensions, which project laterally from the front end of the box or casing 9.

Each clutch 18 is provided with a sleeve 23, fixed to the hub of the adjacent wheel and provided at its ends with annular flanges forming an intermediate groove or way, and one of the flanges is provided with a series of ratchet-teeth shouldered at their rear ends and adapted to be engaged by a tooth 24 of a clutch-section 25, which consists of a curved bar arranged at the top of the axle and a chain 26, extending beneath the axle. The curved bar of the chain 26 encircles the sleeve and is disposed in the groove or way between the annular flanges. The clutch-sections are provided with rearwardly-extending arms having eyes which are detachably connected by hooks 27 of the chain 15 and which are designed to be detached to prevent the brake from operating when it is desired to back the vehicle. When the front wheels rotate forward, the ratchet-teeth of the sleeve slide past the tooth 24, but when the wheels rotate rearward the tooth 24 engages the ratchet-teeth and is carried around the axle by them. The ratchet-teeth are arranged at the inner ends of the sleeves, and the flexible connection 15 converges rearwardly and operates to hold the teeth 24 in position for engaging the ratchet-teeth.

The front portion of the connecting-bar 11 is provided with a rectangular frame 28, which receives the front portion of the reach and which is arranged above and below the same. The sides of the frame 29 pass through suitable slots of the front bolster and the front axle and are provided with longitudinal slots 30 to receive the king-bolt. The frame is provided in rear of the front axle with hooks 31.

The front end of the rectangular frame of the connecting-bar is located in rear of the pole 32, which has a limited longitudinal movement on the front hounds and which is adapted to move the connecting-bar rearward to apply the brake. The upper side of the frame carries a spiral spring 33, which is interposed between the front bolster and the front end of the frame to throw the brake-shoes off the wheels when the pole moves forward away from the connecting-bar. The pole is pivoted between the front hounds 35 by a transverse pin 36, which is arranged in horizontal slots 37 of the said hounds, and when it is desired to back the vehicle the pole is locked against longitudinal movement on the hounds by a hinged catch 38, provided with a pair of lugs 39, adapted to extend through vertical slots 40 of the front hounds and engage the transverse pivot 36 and hold the same against rearward movement. When the brake is in operation, the hinged catch is swung forward to the position illustrated in Figs. 1 and 3 of the accompanying drawings. Instead of making the pole longitudinally movable a connection may extend from the bar 11 to the neck-yoke, as will be readily understood.

It will be seen that the automatic brake is simple and comparatively inexpensive in construction, that it is positive and reliable in operation, and that it will operate when a vehicle is ascending or descending a hill, and may be readily thrown out of operation when it is desired to back a vehicle. It will also be seen that the springs of the flexible connection are adapted to facilitate the starting of the vehicle by assisting in rotating the front wheels.

Changes in the form, proportion, and minor details of construction may be resorted to without departing from the principle or sacrificing any of the advantages of the invention.

What I claim is—

1. In an automatic vehicle-brake, the combination with a running-gear, brake-levers mounted on the running-gear, brake-shoes connected with the brake-levers and arranged to engage the hind wheels, a longitudinal bar connected with the brake-levers, and a flexible connection extending from two of the vehicle-wheels to the longitudinal bar and adapted to be wound up when the wheels rotate rearward, whereby the brake will be automatically applied when ascending a hill, substantially as described.

2. In an automatic vehicle-brake, the combination with a running-gear, of a longitudinally-movable bar mounted thereon and provided with a pulley, a pair of pulleys mounted on the running-gear in rear of the said pulley, a flexible connection passing around the pulley of the said bar, extending rearward therefrom to the pair of pulleys and connected with the front wheels and adapted to be wound up by the same when the wheels rotate rearward, brake-shoes and connections between the brake-shoes and the said bar, whereby the brake-shoes will be carried into contact with the vehicle-wheels when the said bar moves rearward, substantially as described.

3. In an automatic vehicle-brake, the combination with a running-gear, of transverse brake-levers fulcrumed thereon, longitudinal rods pivoted to the outer ends of the brake-levers and mounted in suitable guides, brake-shoes connected with the said rods and arranged to engage the hind wheels at the back thereof, a longitudinally-movable bar connected with the inner ends of the brake-levers, and a longitudinally-movable pole mounted on the front of the running-gear and arranged to engage the said bar, substantially as and for the purpose described.

4. In an automatic vehicle-brake, the combination of a running-gear provided at its front hounds with vertical and horizontal slots, a longitudinally-movable pole connected with the front hounds by a pivot arranged in the horizontal slots, brake-levers fulcrumed on the running-gear, rods extending rearward from the outer ends of the brake-levers and provided with brake-shoes for engaging the hind wheels, a longitudinally-movable bar connected with the inner ends of the brake-levers and arranged to be engaged by the said pole, and a hinged catch mounted on the front hounds and provided with lugs arranged to enter the vertical slots and engage the pivot of the pole to hold the latter against rearward movement, substantially as described.

5. In an automatic vehicle-brake, the combination with a running-gear, of a box or casing connecting the rear hounds to the reach, provided at its rear end with laterally-projecting arms and having perforated ears at its front end, brake-levers fulcrumed on the arms, brake-shoes connected with the outer ends of the brake-levers, a longitudinal bar connected with the inner ends of the brake-lever and provided with a loop, pulleys mounted between the said ears and in the loop, a flexible connection passing around the said pulleys and extending to the front wheels, and clutches connected with the hubs of the wheels and with the ends of the flexible connection and adapted to wind the same up when the wheels rotate rearward, substantially as described.

6. In an automatic vehicle-brake, the combination with the running-gear, of transverse brake-levers fulcrumed between their ends thereon, longitudinal rods extending rearward from the outer ends of the brake-levers and provided at their rear ends with brake-shoes arranged to engage the hind wheels at the back thereof, rearwardly-extending guides mounted on the running-gear and supporting said rods, a longitudinal connecting-bar pivoted to the inner ends of the brake-levers and provided at its front end with a frame extending in advance of the front axle, a spring interposed between the front of the frame and the front axle, and a longitudinally-movable pole arranged to engage the front of the frame, substantially as described.

7. In an automatic vehicle-brake, the combination of a running-gear, brake-levers fulcrumed thereon, brake-shoes connected with the brake-levers, a longitudinal bar connected with the brake-levers and provided with a frame having oppositely-disposed hooks, pulleys mounted on the longitudinal bar and on the running-gear, a flexible connection passing around the said pulleys, extending to the front wheels and provided with hooks adapted to engage the said hooks, and clutches mounted on the hubs of the front wheels and having sections to be engaged by the hooks of the flexible connection, substantially as described.

8. In an automatic vehicle-brake, the combination of a running-gear, brake mechanism, a flexible connection extending from the brake mechanism to the front wheels, and clutches fixed to the hubs of the front wheels and each comprising a sleeve provided with flanges forming a groove, one of the flanges being provided with ratchet-teeth, and a clutch-section arranged in the groove or way receiving the ends of the flexible connection and consisting of a curved bar having a tooth, and a chain or the like connected with the curved bar and embracing the sleeve, substantially as described.

9. In an automatic vehicle-brake, the combination of brake mechanism, clutches mounted on two of the wheels and adapted to be thrown into operation when the said wheels move rearward, and a flexible connection extending from the brake mechanism to the clutches, adapted to apply the former when the wheels move rearward and provided with spiral springs arranged to be distended when the brake is applied, and adapted to assist in rotating the wheels forward in starting a vehicle, substantially as described.

In testimony that I claim the foregoing as my own I have hereto affixed my signature in the presence of two witnesses.

WILLIAM MONAGHAN.

Witnesses:
 NORMAN W. LYONS,
 JOSEPH SUGDEN.